US006789110B1

(12) United States Patent
Short et al.

(10) Patent No.: US 6,789,110 B1
(45) Date of Patent: Sep. 7, 2004

(54) INFORMATION AND CONTROL CONSOLE FOR USE WITH A NETWORK GATEWAY INTERFACE

(75) Inventors: Joel E. Short, Los Angeles, CA (US); Barry R. Robbins, San Diego, CA (US); Josh J. Goldstein, Agora Hills, CA (US); Andrew P. Wandler, Acton, CA (US)

(73) Assignee: Nomadix, Inc., Westlake Village, CA (US)

( * ) Notice: Subject to any disclaimer, the term of this patent is extended or adjusted under 35 U.S.C. 154(b) by 0 days.

(21) Appl. No.: 09/541,877

(22) Filed: Apr. 3, 2000

Related U.S. Application Data
(60) Provisional application No. 60/161,139, filed on Oct. 22, 1999.

(51) Int. Cl.[7] .............................................. G06F 15/177
(52) U.S. Cl. ....................................... 709/221; 709/227
(58) Field of Search ................................ 709/203, 208, 709/221, 222, 226–228

(56) References Cited

U.S. PATENT DOCUMENTS

| | | | | |
|---|---|---|---|---|
| 6,047,051 A | * | 4/2000 | Ginzboorg et al. | 379/130 |
| 6,085,247 A | * | 7/2000 | Parsons et al. | 709/227 |
| 6,157,946 A | | 12/2000 | Itakura et al. | |
| 6,286,039 B1 | * | 9/2001 | Van Horne et al. | 709/221 |
| 6,427,174 B1 | * | 7/2002 | Sitaraman et al. | 709/245 |
| 6,513,060 B1 | * | 1/2003 | Nixon et al. | 709/203 |
| 6,539,431 B1 | * | 3/2003 | Sitaraman et al. | 709/226 |
| 2001/0047392 A1 | * | 11/2001 | Murphy, Jr. et al. | 709/208 |
| 2002/0152311 A1 | * | 10/2002 | Veltman et al. | 709/227 |
| 2003/0061619 A1 | * | 3/2003 | Giammaressi | 725/95 |

FOREIGN PATENT DOCUMENTS

| | | |
|---|---|---|
| WO | WO 99/65183 A2 | 12/1999 |

OTHER PUBLICATIONS

PCT International Search Report dated Jun. 15, 2001 for International Application No. PCT/US 00 28541, filed Oct. 16, 2000; Applicant—Nomadix, Inc., et al.
R. J. Edell, et al.; "*Billing Users and Pricing for TCP,*" IEEE Journal on Selected Areas in Communications vol. 13 (1995) Sep., No. 7, New York, NY.
N. Fujino, et al.; "*Mobile Information Service Based on Multi–Agent Architecture,*" IEICE Transactions on Communications, J.P. Institute Electronics Information and Comm., Eng., Tokyo, vol. E80–B, Oct., 1997.

* cited by examiner

*Primary Examiner*—Hosain Alam
*Assistant Examiner*—Canh Duong
(74) *Attorney, Agent, or Firm*—Alston & Bird LLP

(57) ABSTRACT

A method for communicating to a host information during an existing networking session. The method comprises the steps of establishing computer network access to a user's host through a gateway interface, creating information and control console packets at the gateway interface, sending the information and control console packets to the user's host, and generating an information and control console on the monitor of the user's host that comprises data. The data will typically comprise user-specific data based upon a user's profile, the chosen billing scheme, the chosen service level or the location from which the user desires access. The gateway interface is capable of transparently connecting the user/subscriber to multiple networks without the need to reconfigure the user's host computer. The information and control console allows the gateway administrator to provide information to the user/subscriber. The information and control console may include information relating to marketing, advertising, services offered and network session monitoring parameters and the like. In one embodiment the information provided for in the information and control console may comprise network session specific data. The user/subscriber can then act on the data provided to dynamically change the features of a current network session.

36 Claims, 6 Drawing Sheets

INFORMATION AND CONTROL CONSOLE FOR USE WITH A NETWORK GATEWAY INTERFACE

CROSS-REFERENCE TO RELATED APPLICATIONS

The present application claims priority from U.S. Provisional Patent Application Serial No. 60/161,139, the contents of which are incorporated by reference.

FIELD OF THE INVENTION

The present invention relates generally to a network gateway interface and, more particularly, to an information and control console for use with a network gateway interface.

BACKGROUND OF THE INVENTION

In order for a computer to function properly in a network environment, the computer must be appropriately configured. Among other things, this configuration process establishes the protocol and other parameters by which the computer transmits and receives data. In one common example, a plurality of computers are networked to create a local area network (LAN). In the LAN, each computer must be appropriately configured in order to exchange data over the network. Since most networks are customized to meet a unique set of requirements, computers that are part of different networks are generally configured in different manners in order to appropriately communicate with their respective networks.

While desktop computers generally remain a part of the same network for a substantial period of time, laptops, handhelds, personal digital assistants (PDAs), cellphones or other portable computers (collectively "portable computers") are specifically designed to be transportable. As such, portable computers are connected to different networks at different times depending upon the location of the computer. In a common example in which the portable computer serves as an employee's desktop computer, the portable computer is configured to communicate with their employer's network, i.e., the enterprise network. When the employee travels, however, the portable computer may be connected to different networks that communicate in different manners. In this regard, the employee may connect the portable computer to the network maintained by an airport, a hotel, a cellular telephone network operator or any other locale in order to access the enterprise network, the Internet or some other on-line service. The portable computer is also commonly brought to the employee's residence where it is used to access various networks, such as, the enterprise network, a home network, the Internet and the like. Since these other networks are configured somewhat differently, however, the portable computer must also be reconfigured in order to properly communicate with these other networks. Typically, this configuration is performed by the user each time that the portable computer is connected to a different network. As will be apparent, this repeated reconfiguration of the portable computer is not only quite time consuming, but is also prone to errors. The reconfiguration procedure may even be beyond the capabilities of many users or in violation of their employer's information technology (IT) policy.

As described by U.S. patent applications Ser. No. 08/816, 174 entitled "Nomadic Router", filed on Mar. 12, 1997, and now abandoned in the name of inventors Short et. al., and U.S. patent application Ser. No. 09/458,602 entitled "Systems and Methods for Authorizing, Authenticating and Accounting Users Having Transparent Computer Access to a Network Using a Gateway Interface", filed on Dec. 08, 1999, and still pending in the name of inventors Pagan, et. al., a Universal Subscriber Gateway (USG) device has been developed by Nomadix, Inc. of Westlake Village, Calif., the assignee of the present invention. The contents of both of these applications are expressly incorporated by reference as if fully set forth herein. The gateway interface serves as an interface connecting the user/subscriber to a number of networks or other online services. For example, the gateway interface can serve as a gateway to the Internet, the enterprise network, or other networks and/or on-line services. In addition to serving as a gateway, the gateway interface automatically adapts to a host, in order that it may communicate with the new network in a manner that is transparent both to the user/subscriber and the new network. Once the gateway interface has appropriately adapted to the user's host, the host can communicate via the new network, such as the network at a hotel, at home, at an airport, or any other location, in order to access other networks, such as the enterprise network, or other online services, such as the internet.

The transient user/subscriber, and more specifically the remote or laptop user, benefits from being able to access a myriad of computer networks without having to undergo the time-consuming and all-too-often daunting task of reconfiguring their host in accordance with network specific configurations. From another perspective, the network service provider benefits from avoiding "on-site" visits and/or technical support calls from the user who is unable to properly re-configure the portable computer. In this fashion, the gateway interface is capable of providing more efficient network access and network maintenance to the user/subscriber and the network operator.

A gateway interface is also instrumental in providing the user/subscriber broadband network access that can be tailored to the user's needs. In many instances the remote user is concerned with being able to acquire network access and levels of service in the most cost-effective manner. Correspondingly, the gateway interface administrator desires the capability to be able to offer the user/subscriber numerous different service, routing, and billing rate options. By way of example, the remote user in a hotel environment may desire a network subscription for the duration of their hotel stay while the user in an airport may desire a network subscription for the duration of their layover or until their scheduled flight departs. Additionally, a user may desire a certain level of service based on bandwidth concerns and the need for higher or lower data transfer rates. For example, the user/subscriber who is accessing a network for the purpose of viewing text may desire a lower bandwidth service level that meets their particular needs, however, another user/subscriber who is accessing a network for the purpose of downloading files may desire a higher bandwidth service level capable of transferring data at higher speeds.

Additionally, the network service provider benefits from being able to offer various service, routing and billing options to the user/subscriber. By offering service at varying speeds and pricing scales, the network service provider is able to minimize network congestion, i.e. not all user/subscribers are tied to one high speed (and high cost) service. Lessening network traffic is beneficial for attracting new subscribers and insuring that pre-existing subscribers maintain status quo. From an economic standpoint, differentiated service quality and usage based pricing will promote the use and deployment of broadband network access and enhance the revenue models of the network service providers. No longer will the user/subscriber be tied to a flat-rate billing scheme that offers a single level of service quality. Flat-rate pricing and single level service quality consumes resources, requires light network users to subsidize heavy users, and hinders the dissemination of widespread use of broadband network access. Additionally, the ability to provide differentiated service quality and usage based pricing can be enhanced by providing these features on demand and dynamically throughout the user's network session. For a more detailed discussion of the need to provide differentiated quality of service and billing schemes to the broadband network environment see "Providing Internet Access: What We Learn From INDEX", INDEX project report #99-010W, Apr. 16, 1999, (http://www.INDEX.Berkeley.edu/reports/99-010W), R. J. Edell et.al. That document is herein expressly incorporated by reference as if setforth fully herein.

In today's fast paced computing and networking environment it is even more advantageous to provide these service and billing options dynamically, allowing the user/subscriber to change, for example, billing rates, service routing or bandwidth capacity while a network session is on going. This would allow the user/subscriber to be billed at one rate while downloading the data-intensive file while choosing a more cost-effective billing structure for the less data-intensive activities. Additionally, the dynamic nature of this process would allow the user/subscriber to change service levels or billing rates without the need to exit the network and initiate a new log-on procedure. In effect, the user/subscriber benefits from having a more efficient and less time-consuming means of altering service levels and billing structure.

In order to make the user/subscriber constantly aware that these diverse service and billing options exist the gateway interface administrator needs to be able to provide the user/subscriber with real-time information pertaining to the network session(s) that the user currently has on-going. The gateway administrator would benefit from being able to provide the user/subscriber with constant or intermittent data related to the network sessions currently on-going, the duration of those sessions, the bandwidth currently being used, the number of bytes that have been transferred and any other information related to the current network session. In this manner, the user/subscriber has the capability to monitor and make the appropriate adjustments to the billing structure and/or service levels related to the network sessions that he or she currently has on going. The user/subscriber may choose to stop or shutdown connections (and thus billing) to those networks not currently being utilized. The user/subscriber may monitor the duration of the network session and determine that a longer subscription is necessary or the user may observe the bandwidth currently used and determine that the current application warrants an increase or decrease in bandwidth. The ability to provide this real-time information to the user is especially important in light of the fact that the typical, infrequent gateway interface user will be unfamiliar with billing and service structure and, particularly, the capability to change these features on-the-fly.

From the perspective of the network service provider, the ability to offer flexible service quality, routing options and billing plans ultimately can lead to less overall network congestion. The current broadband standard of flat rate billing and one-dimensional service and routing options force the network service provider in to effectively transmitting all network data at maximum bandwidth. By lessening the congestion within the network, the service provider is able to accommodate more user/subscribers and provide those user/subscribers with a more effective network. The ability to lessen congestion is even more apparent if the network service provider can offer the user/subscriber the capability to make changes to the service quality, routing and billing structure while the network session is on going. Additionally, by offering differentiated quality of service, routing and billing the network service provider may be able to increase the volume of user/subscribers accessing the network.

SUMMARY OF THE INVENTION

The present invention comprises an information and control console that is administered through a gateway interface. The gateway interface is capable of transparently connecting the user/subscriber to multiple networks without the need to reconfigure the user's host computer. The information and control console allows the gateway administrator, the Internet service provider (ISP) and/or application service provider (ASP) to provide real-time information to the user/subscriber. The information provided to the user in the information and control console may be user-specific information related to the current network session, the current location of the user's host, user-specific profile type information or the like. The user/subscriber can then act on the data provided to dynamically change the features of a current network session. Additionally, the information and control console can provide for information or access to information through appropriate links. In many instances, the information provided or the links to information may be user-specific information. The basis or "know-how" for the user-specific data can be provided by the network service provider (i.e. user profiles in the network database) or through direct user inputs.

The information and control console provides the gateway administrator, the ISP and/or the ASP the capability to provide the user with limitless forms of information and networking options. For example, the gateway administrator can provide the user with network session monitoring information, or it can provide for marketing capabilities through advertising medium or it can provide the gateway administrator with a means to poll or survey users. The ISP and/or the ASP can provide the user with user-specific targeted marketing and advertising information or various service delivery platforms. These examples of the types of information that an information and control console may provide should not be construed as limiting. The information and control console may be configured by the gateway administrator, network provider or user/subscriber to provide a wide variety of information.

In one embodiment of the invention an information and control console is provided to a user/subscriber during a network session. The information and control console may include information and links to information in response to configuration of the panel by the gateway administrator or the subscriber/user. In many instances, the information that is provided for in the information and control console will be user-specific data assembled from user profiles in network databases or from direct user/subscriber inputs. The information that is provided to the user/subscriber via the information and control console may include monitoring of the network session, polling/surveying the user/subscriber, user-tailored advertisements and information on other services/features offered by the gateway administrator, the network provider and/or the application service provider.

In another embodiment of the present invention the information and control console may include network monitoring attributes such as, identifying the network session(s) currently in-use, identifying the duration of network sessions currently in-use, identifying the bandwidth currently available for a specific network session and identifying the current amount of bytes received and/or sent for a specific network session. It is to be understood, by those skilled in the art to which this invention relates that all conceivable useful information relating to the current network session could be displayed to the user/subscriber in a multitude of combinations as defined by the user/subscriber and/or the gateway administrator. The gateway administrator will have the capability to dynamically change the information supplied in the information and control console based on many factors, including the location of the user/subscriber, the profile of the user/subscriber and the chosen billing scheme and service level.

In yet another embodiment of the present invention a method is provided for communicating to a network user predefined information during an ongoing networking session. The method comprises of the steps of establishing computer network access to a user s host through a gateway interface that has the capacity to transparently configure a host to meet the requirements of available networks. In one embodiment, after the gateway interface has granted access to the host the gateway interface communicates with databases associated with the gateway interface to determine user-specific data. The user-specific data may include user-profiled information, host-location-related data, user-specific network monitoring information or the like. This user-specific data is then used to create information and control console packets at the gateway interface, which are then sent to the user's host. The information and control console packets reach the host and generate information and control consoles on a monitor of the user's host. The information and control consoles will comprise data that typically is related to a user's profile, the chosen billing scheme, the chosen service level, the location from which the user desires access or any other information deemed pertinent by the gateway administrator or user/subscriber.

DETAILED DESCRIPTION OF THE
PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
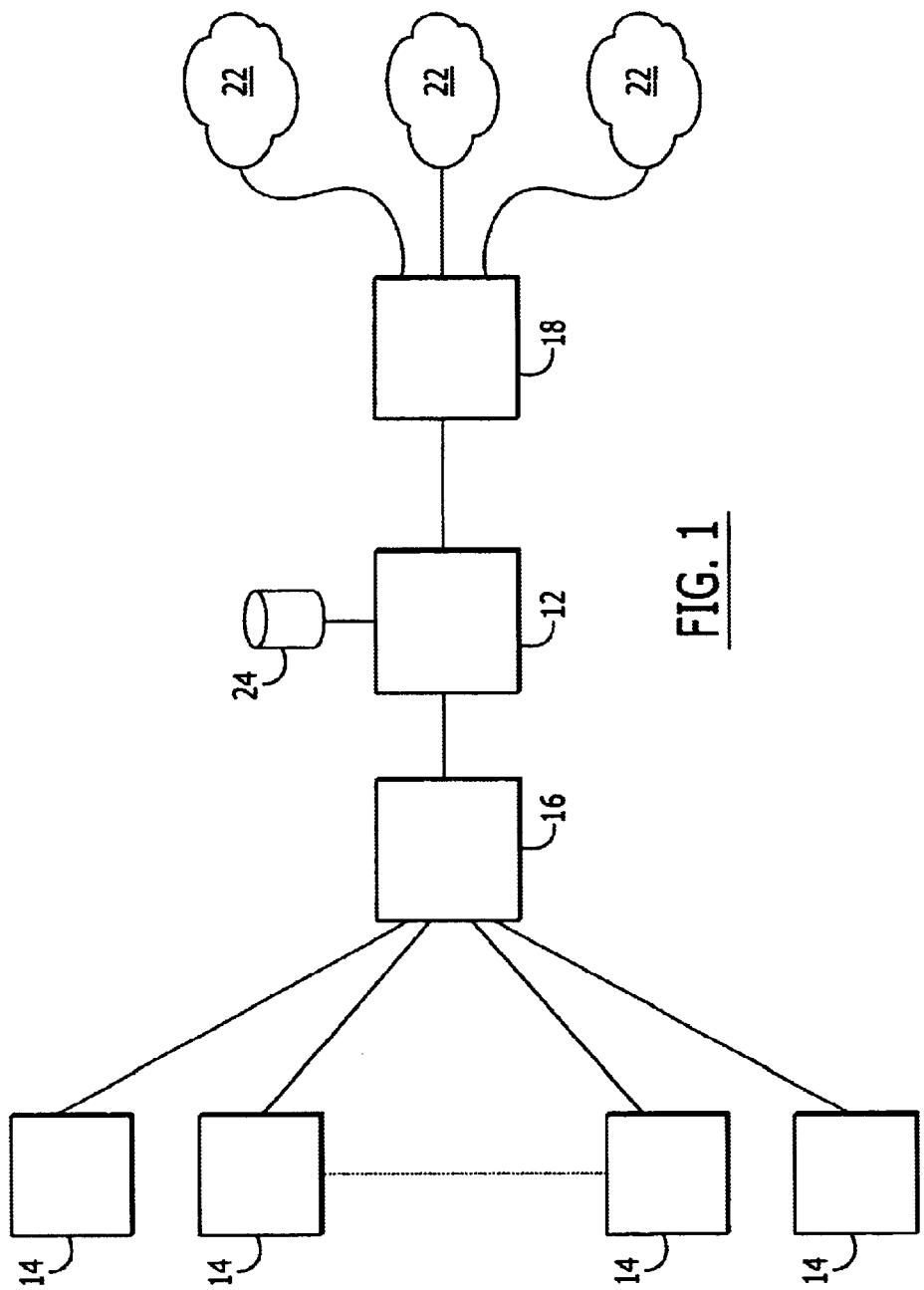
FIG. 1 is a block diagram of a computer system that includes a gateway interface for automatically configuring one or more computers to communicate via the gateway interface with other networks or other online services.

Referring now to FIG. 1, the computer network system 10 that includes a gateway interface 12 is depicted in block diagram form. The computer network system typically includes a plurality of hosts 14 that access the computer network system in order to gain access to other networks or other online services. For example, the hosts can be plugged into ports that are located in different rooms of a hotel or a multi-dwelling residence. Alternatively, the hosts can be plugged into ports in an airport, an arena, or the like. The computer network system includes a gateway interface that provides for an access point between the plurality of computers and the various networks or other online services. Most commonly, the gateway interface is located near the hosts at a relatively low position in the structure of the overall network. (i.e. the gateway interface will be located within the hotel, multi-unit residence, airport, etc.) However, the gateway interface can be located at a higher position in the overall network structure such as at a Point of Presence (PoP) within a Network Operating Center (NOC), if so desired. Although the gateway interface can be physically embodied in many different fashions, the gateway interface typically includes a controller and a memory device in which software is stored that defines the operational characteristics of the gateway interface. Alternatively, the gateway interface can be embedded within another network device, such as the access controller or a router, or the software that defines the functioning of the gateway interface can be stored on a PCMCIA card that can be inserted into the computer in order to automatically reconfigure the computer to communicate with a different computer system.

The computer network system 10 also typically includes an access controller 16 positioned between the hosts 14 and the gateway interface 12 for multiplexing the signals received from the plurality of computers onto a link to the gateway interface. Depending upon the medium by which the hosts are connected to the access controller, the access controller can be configured in different manners. For example, the access controller can be a digital subscriber line access module (DSLAM) for signals transmitted via regular telephone lines, a cable head end for signals transmitted via coaxial cables, a wireless access point (WAP) for signals transmitted via a wireless network, a cable modem termination system (CMPS), a switch or the like. As also shown in FIG. 1, the computer system typically includes one or more routers 18 and/or servers (not shown in FIG. 1) of a plurality of computer networks 20 or other online services 22. While the computer system is depicted to have a single router, the computer system can have a plurality of routers, switches, bridges, or the like that are arranged in some hierarchical fashion in order to appropriately route traffic to and from the various networks or other online services. In this regard, the gateway interface typically establishes a link with one or more routers. The routers, in turn, establish links with the servers of other networks or other online service providers, such as internet service providers, based upon the subscriber's selection.

The gateway interface 12 is specifically designed to adapt to the configuration of each of the hosts 14 that log onto the computer network system 10 in a manner that is transparent to the subscriber and the computer network. In the typical computer network that employs dynamic host configuration protocol (DHCP) service, an IP address is assigned to the computer that is logging onto the computer network through communication with the gateway interface. The DHCP service can be provided by an external DHCP server 24 or it can be provided by an internal DHCP server located in unison with the gateway interface. Upon opening their web browser or otherwise attempting to access an on-line service, the gateway interface will direct the subscriber to enter some form of an identifier such as their ID and password. In an alternate embodiment of the device, it is anticipated that the gateway interface will be able to automatically detect this information upon connection of the computer to the network or any attempt to log in. The gateway interface then determines if the subscriber is entitled to access the computer system, the level of access and/or the type of services to which the subscriber is entitled according to an Authentication, Authorization and Accounting (AAA) procedure. For a more detailed discussion of the AAA procedure see U.S. patent application Ser. No. 08/816,174 and U.S. patent application Ser. No. 09/458,602, both applications have been assigned to Nomadix, L.L.C., the assignee of the present invention and have been previously incorporated by reference as if setforth fully herein. An AAA server, which is a database of subscriber records, may be remote to the gateway interface or the AAA database may be incorporated into the physical embodiment housing the gateway interface. Assuming that the subscriber has been authenticated and has authorization, the gateway interface typically presents new subscribers with a home page or control panel that identifies, among other things, the online services or other computer networks that are accessible via the gateway interface. In addition, the home page presented by the gateway interface can provide information regarding the current parameters or settings that will govern the access provided to the particular subscriber. As such, the gateway administrator can readily alter the parameters or other settings in order to tailor the service according to their particular application. Typically, changes in the parameters or other settings that will potentially utilize additional resources of the computer network system will come at a cost, such that the gateway administrator will charge the subscriber a higher rate for their service. For example, a subscriber may elect to increase the transfer rate at which signals are transmitted across the computer network and pay a correspondingly higher price for the expedited service.

The home page also permits the subscriber to select the computer network 20 or other online services 22 that the subscriber wishes to access. For example, the subscriber can access the enterprise network on which the computer is typically resident. Alternatively, the subscriber can access the internet or other on-line services. Once the subscriber elects to access a computer network or other online service, the gateway interface establishes an appropriate link via one or more routers 18 to the desired computer network or online service.

Thereafter, the subscriber can communicate freely with the desired computer network 20 or other online service 22. In order to support this communication, the gateway interface 12 generally performs a packet translation function that is transparent to the user/subscriber and the network. In this regard, for outbound traffic from the computer 12 to the computer network or other on-line service, the gateway interface changes attributes within the packet coming from the user/subscriber, such as the source address, checksum, and application specific parameters, to meet the criteria of the network to which the user/subscriber has accessed. In addition, the outgoing packet includes an attribute that will direct all incoming packets from the accessed network to be routed through the gateway interface. In contrast, the inbound traffic from the computer network or other online service that is routed through the gateway interface, undergoes a translation function at the gateway interface so that the packets are properly formatted for the user/subscriber's host. In this manner, the packet translation process that takes place at the gateway interface is transparent to the host, which appears to send and receive data directly from the accessed computer network. Additional information regarding the translation function is provided by U.S. patent application Ser. No. 08/816,714, assigned to Nomadix L.L.C, the assignee of the present invention and previously incorporated by reference as if setforth herein. By implementing the gateway interface as an intermediary between the user/subscriber and the computer network or other online service, the user/subscriber will eliminate the need to re-configure their host 12 upon accessing subsequent networks.

In one embodiment of the present invention, the gateway interface implements an information and control console. Once the user/subscriber has gained access to one or more networks through the gateway interface the information and control console is communicated to the host computer from the gateway interface and provides the user/subscriber with information. The information that is provided to the user/subscriber in the information and control console may include information of various types, forms and content. The information that is provided for in the information and control console may be static information or dynamic information. The information provided in the information and control console may be user specific, site specific or gateway interface specific. In the user-specific model the data may be based on information found in network databases or information provided by the user/subscriber. For example, the network databases may include user profiles that have been assembled by querying the user or by logging the networks and sites visited by the user. Additionally, the information provided for in the information and control console may be network monitoring information, for marketing purposes or any other conceivable purpose that the gateway administrator or user/subscriber deems appropriate.

Within the realm of marketing, the information and control console may include advertising tailored to the specific needs of the user/subscriber. The gateway interface would be capable of tailoring the information based upon the current location of the user s host, user profiles in the network, gateway administrator concerns or the like. Typically, this information is provided for in the information and control console in the form of links to other available networks, Internet sites, intranets or similar networking possibilities. In this fashion, the gateway administrator can offer the user/subscriber access to other networks and services without the user/subscriber having to register for or be approved for a subscription to these other networks or services. The gateway administrator can act as a broker for these other networks and services and, thereby, offer the user/subscriber short-term access to these networks and services at reduced rates.

The information and control console may also incorporate surveys or links to surveys to provide the gateway administrator or network provider with beneficial statistical data. As an ancillary benefit, the user/subscriber who responds to the surveys may be rewarded with network access credit or upgraded quality. Additionally, the gateway administrator can offer additional services to the user/subscriber by way of the information and control console or links to these services may be offered on the information and control console. These services offered by the network service provider are not limited to the services related to the network connection. For example, a hotel may desire to offer the user/subscriber in-room food service or a multi-unit dwelling may want to offer house cleaning service.

The information and control console may also comprise network monitoring information related to the status of the current network session. By way of example this information may include, current billing structure data, the category/level of service that the user/subscriber has chosen, the bandwidth being provided to the user, the bytes of information currently sent or received, the current status of network connection(s) and the duration of the existing network connection(s). It is to be understood, by those skilled in the art to which this invention relates that all conceivable useful information relating to the current network session could be displayed to the user/subscriber in a multitude of combinations as defined by the user/subscriber and/or the gateway administrator. The gateway administrator will have the capability to dynamically change the information supplied in the information and control console based on many factors, including the location of the user/subscriber, the profile of the user subscriber and the chosen billing scheme and service level. The information provided in the information and control console may prompt the user/subscriber to return to the provisioning page to adjust any number of specific parameters, such as the billing scheme, the routing, the level of service and/or other user-related parameters or the user may be able to adjust the billing scheme and service level by responding directly to the information and control console.

The information and control console may be implemented with an object-oriented programming language such as Java developed by Sun Microsystems, Incorporated of Mountain View, Calif. The code that defines the information and control console is embodied within the gateway interface, while the display monitor and the driver are located with the host computer's that are in communication with the gateway interface. The object oriented programming language that is used should be capable of creating executable content (i.e. self-running applications) that can be easily distributed through networking environments. The object oriented programming language should be capable of creating special programs, typically referred to as applets that can be incorporated in web pages to make them interactive. In this invention the applets take the form of the information and control consoles. It should be noted that the chosen object-oriented programming language would require that a compatible web browser be implemented to interpret and run the information and control console. It is also possible to implement the information and control console using other programming languages, such as HTML; however, these languages may not be able to provide all the dynamic capabilities that languages, such as Java provide.

The gateway administrator or the user/subscriber may have control over how frequently an information and control console is invoked by the gateway interface so that it appears on the monitor of the user/subscriber. Typically the gateway interface will be configured to invoke an initial information and control console to the user/subscriber's host a short period of time after the user has gained access to a network service provided by the gateway administrator. Additionally, the information and control console may be invoked automatically in response to predetermined conditions. An example being, invoking the information and control console in response to the user/subscriber's imminent subscription expiration. The information and control console may also be generated and controlled by the user/subscriber. The user/subscriber can choose to have the information and control console visual throughout the network session or the pop-up control can be minimized or deleted. It is also possible for the gateway administer to configure the information and control console so that it can not be deleted or the user/subscriber can be rewarded (e.g. additional access time or the like) for maintaining a visible pop-up control throughout the network session.

The information and control console is configured to send heartbeat packets back to the gateway interface at predetermined specified intervals to let the gateway know that the user/subscriber still has an active, information and control console in use or at the user's disposal. If the gateway interface does not receive a heartbeat from the host after a predetermined period of time, it will assume that the user has deleted the information and control console or the information and control console has otherwise failed. In the instance where a heartbeat is not received by the gateway interface after a predetermined time period, the gateway interface will re-send a new updated information and control console to the user/subscriber. Through the use of these "heartbeats" the gateway interface will be able to insure that the user/subscriber always has ready access to the user-related information provided by the information and control console. The user/subscriber will also have the capability to locate the information and control console anywhere within the viewable area of the computer monitor. The physical embodiment of the information and control console can be modified in an infinite number of ways to suit either the user or the gateway administrator. For example, the panel size, color, graphics, location, form of read out (digital vs. analog), language, scales (e.g. metric vs. U.S.) can all be varied, as well as the rate at which information is provided. Additionally, the information and control console may be configured by the user or gateway administrator such that the outlining panel and background of the console are transparent and, thus, only the linking buttons and other information are visible on the monitor.

It should be noted that in most embodiments the information and control console will only be actively sent from the gateway interface if the user/subscriber is accessing a network provided service, such as broadband Internet access, that is provided by the gateway administrator. If the user chooses to stop using the network service, such as broadband Internet access, they can close the application and the information and control console will correspondingly be inactive. The gateway interface recognizes that the network provided service has been disabled and stops sending information and control console packets to the host. Upon the user/subscriber re-activating the network provided service, the gateway interface will recognize the need to send a new information and control console and begin recognizing "heartbeats" coming from the information and control console. However, it also possible to configure the gateway interface to send information and control console packets to the user/subscriber who is not currently activating a network service or currently involved in a networking session. For offline sending of information and control console packets the host must be in networking communication with the gateway interface.

FIGS. 2–6 are depictions of various examples of information and control consoles providing for network session data. These information and control consoles are shown by way of example to illustrate the various user specific information that the information and control consoles may contain. These information and control consoles are typically associated with a specific billing and/or service level plan. The gateway administrator or the network operator may choose to offer any or all of these billing and/or service options. The information and control console that will be sent to the user/subscriber's computer may be tailored to reflect the user data that is pertinent to the chosen and available billing methods and/or service levels.

Figure 2:
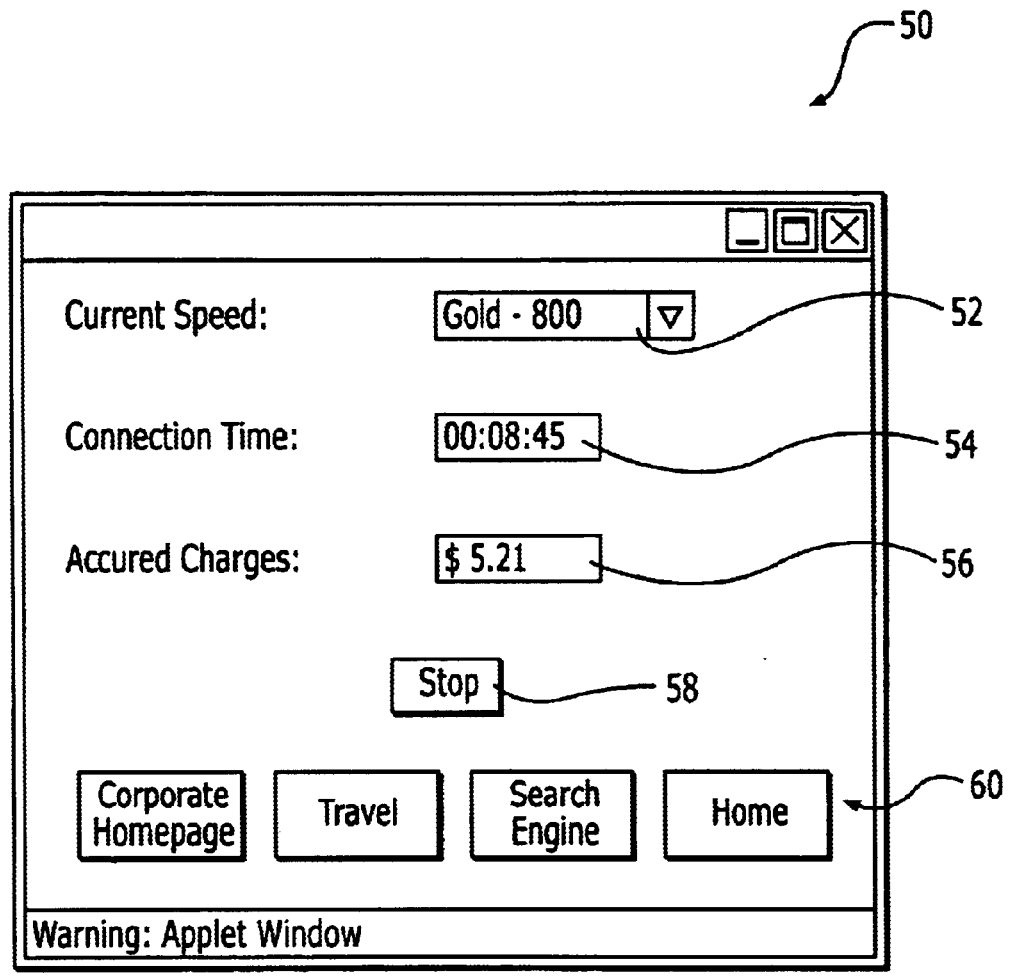
FIGS. 2–7 are illustrations of various examples of information and control consoles, in accordance with an embodiment of the present invention.

FIG. 2 shows an information and control console 50, that includes the current chosen connection speed (i.e. bandwidth) 52, an elapsed time counter 54, a current charges accrued counter 56 and a start/stop button 58. The attribute fields in this information and control console are typically used if the gateway administrator or network operators offer a billing plan based on the bandwidth that the user selects, commonly referred to as a "pay-per-use" method of billing. For example, the gateway administrator or network operators may structure billing at $0.10 per minute for 200 Kbps bandwidth, $0.20 per minute for 400 Kbps bandwidth and $0.35 per minute for 800 Kbps per minute bandwidth. If the user chooses 200 Kpbs at $0.10 per minute, then the initial information and control console will identify 200 Kpbs as the current bandwidth along with the elapsed time that the user has been connected to the accessed network and a running total of the charges that have been incurred. If the user/subscriber desires to change the bandwidth setting, they can click-on the box containing the current bandwidth and are re-directed to a service provisioning screen to choose an alternative billing method.

The start/stop buttons 58 allow the user the benefit of stopping the charges to an account (i.e. temporarily disabling the network) without closing the user's web browser. A user/subscriber can activate the stop button and be re-directed back to the home page or portal page. From the user/subscriber standpoint the ability to momentarily disable the network and stop incurring charges is a cost-effective form of networking. From the gateway administrator or network operator standpoint the momentary network stoppage means the user will be directed back to the portal or home page. By re-directing the user back to the portal or home page the gateway administrator or network operator is provided the opportunity to present the user/subscriber with updated information pertaining to the remote location (i.e. the hotel, the airport etc.). When the user desires to re-establish network connection the user may activate the start button on the information and control console and charges will again incur. The start/stop buttons may be implemented at the discretion of the gateway administrator or network operator and most of the billing plans and service plans will provide for the option of presenting the start/stop button feature within the information and control console. Additionally, the information and control console may comprise a timer (not shown in FIGS. 2–6) that alerts the user/subscriber that a subscription is about to expire.

Additional information and control console fields are provided in the form of click-on buttons 60 located, in this instance, near the bottom of the pop-up panel. By way of example the buttons shown in FIG. 2 provide for links to a corporate home page, a travel site on the Internet, an Internet search engine and a network provider home page. Those of ordinary skill in the art will note that the additional fields within the pop-up panel may encompass infinite possibilities for links, services and information. Additionally, the buttons or any other field within the information and control console may include other types of information options, such as advertising fields or user-specific links or fields based upon data found in the user's profile or inputted by the user/subscriber.

Figure 3:
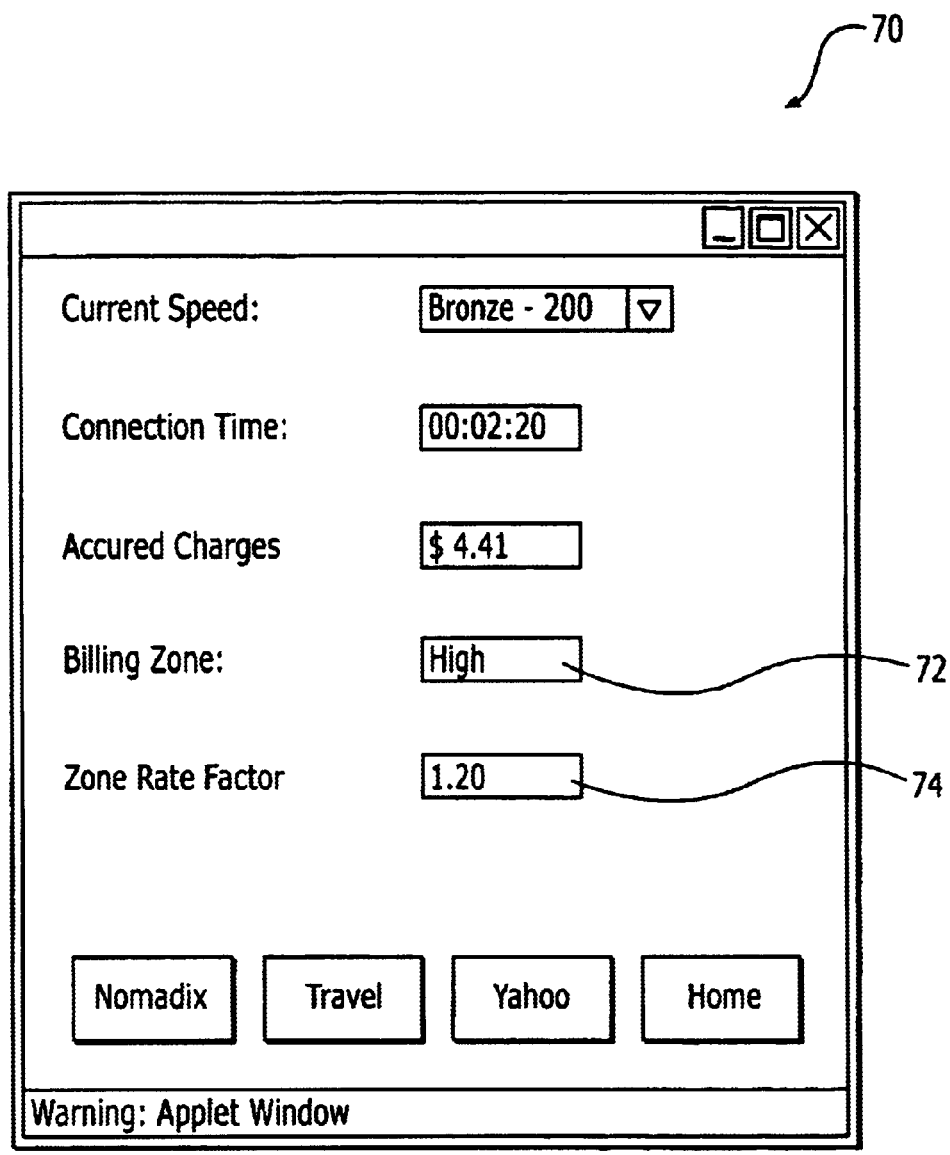

FIG. 3 depicts an information and control console 70 having the additional attribute fields of billing zone 72 and rate factor 74. The gateway administrator or network operators may choose to charge a premium for access during peak usage periods. These periods, or zones, will typically be defined by the hours in the day or the days of the week (i.e. weekday versus weekend day). For example network usage during the 9 am to 5 pm period may be billed at a rate factor of 1.25, while network usage during the 5 pm to 9 am period may be billed at a rate factor of 1.0. Thus, the information and control console will include the billing zone that the user/subscriber currently occupies, as well as the rate factor that is tied to the specific billing zone. The user/subscriber will have been made aware of billing zones and rate factors when the initial service provisioning screen was presented during the log-on and billing process.

Figure 4:
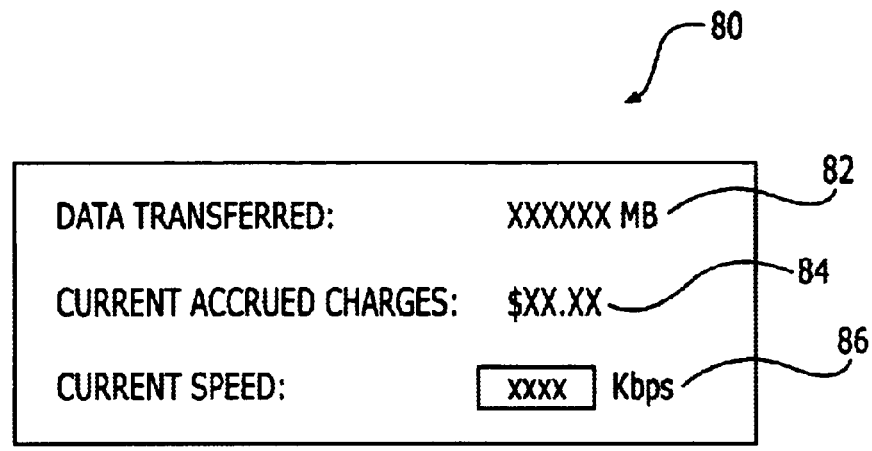

FIG. 4 illustrates an information and control console 80 that includes the current data transferred counter 82, current charges accrued counter 84, and current connection speed 86. The attribute fields in this information and control console are typically used if the gateway administrator or network operators offers a billing plan based on the quantity of data that is transferred, typically both sent and received data, commonly referred to as a "bitmeter" method of billing. For example, the gateway administrator or network operator may choose to charge user/subscribers the flat rate of $1.00 per megabyte of data transmitted. If the user/subscriber desires to change the bandwidth setting, they can click-on the box containing the current bandwidth and are re-directed to a service provisioning screen to choose an alternative bandwidth. The start/stop buttons, not shown in FIG. 4, may also be implemented in this information and control console.

Figure 5:
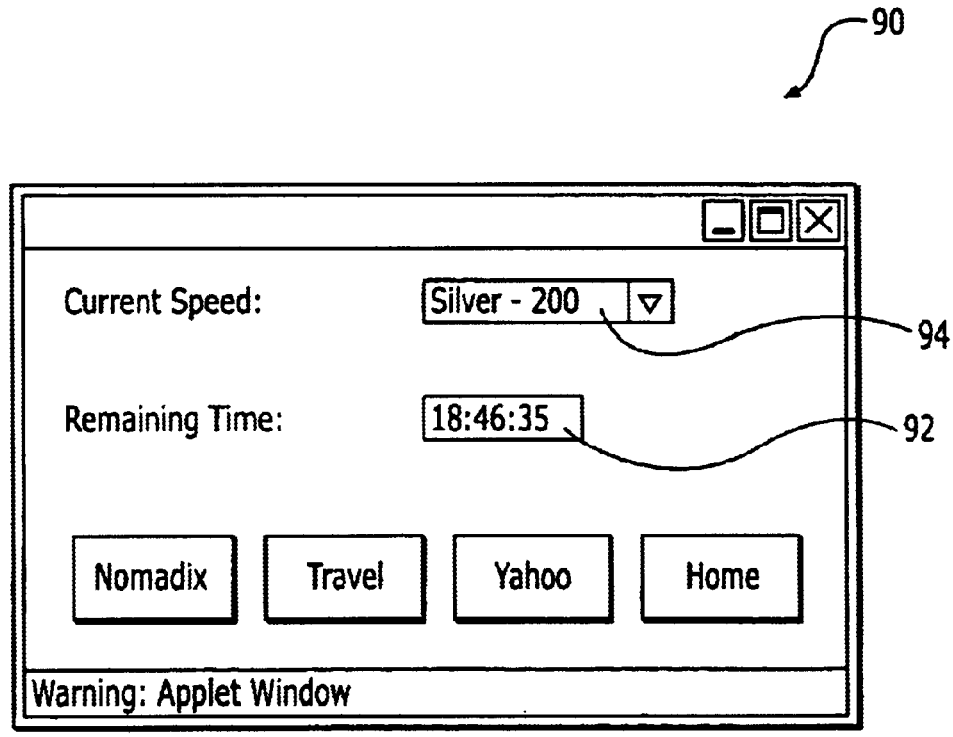

FIG. 5 shows an information and control console 90 that includes a time remaining counter 92 and a current connection speed 94. The attribute fields in this information and control console are typically used if the gateway administrator or network operators offer a billing plan based on a specific level of service (i.e. desired bandwidth) for a specific period of time, commonly referred to as an "expiration time" method of billing. In this billing and service scheme, the user/subscriber may choose different pricing schemes based on the level of service (i.e. desired bandwidth) and the duration of their subscription. For example, the user may be offered a 1, 2, 4, 8 or 24 hour subscription with the option to operate at a 200, 400 or 800 Kpbs bandwidth. If the user/subscriber desires to change the duration of the subscription or the level of service, it may be possible to click-on the box containing the remaining time or current bandwidth, be re-directed to a service provisioning screen and choose an alternate service plan offering a higher level of service or a longer subscription period. The start/stop buttons will not typically be employed in the "expiration time" method because the subscription has a specific time duration.

Figure 6:
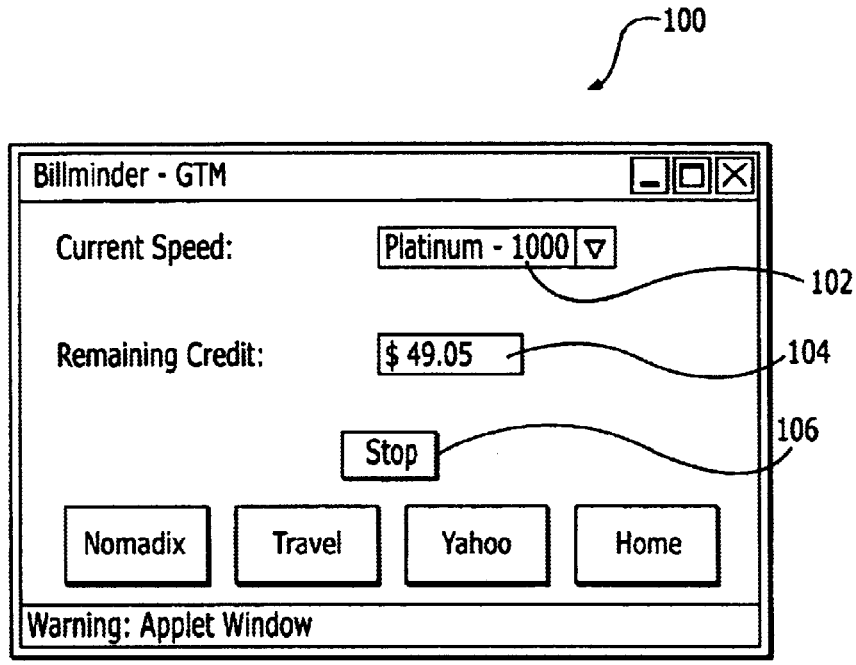

FIG. 6 illustrates an information and control console 100 that includes current connection speed 102, a remaining credit counter 104 and a start/stop button 106. The attribute fields in this information and control console are typically used if the gateway administrator or network operator offers a billing plan based on pre-purchasing a desired amount of network "credit". In this type of billing scheme the user/subscriber will be offered various bandwidth options, each of which is tied to specified costs per minute of use. The user will then purchase a "block" of network access, for example $20.00 of network use. The block of network access will then allow the user to choose the bandwidth of the connection. If the user chooses a slow connection speed they will deplete their "block" of network access more slowly than if they choose a higher connection speed. By clicking-on the bandwidth connection field within the information and control console the user/subscriber will be re-directed to the service provisioning page to change the bandwidth to accommodate a higher or lower connection speed. The start/stop button may also be implemented in this information and control console.

The information and control console is not limited to supplying information related to the user/subscriber's billing and service plans. It is also possible to configure the information and control console to include information that is customized to the user/subscriber or the location/site from which the user is remotely located. For example, the user may be located at a hotel for the purpose of attending a specific convention or conference either in the hotel or within the immediate vicinity of the hotel. The gateway interface may have "learned" this information about the user/subscriber through an initial log-on profile inquiry or the gateway administer may have inputted this information into a database. The gateway interface can store profile information within the user-specific AAA database or it can store and retrieve data from external databases. The gateway interface can be configured to recognize these profiles and to customize the information and control console accordingly. In the hotel scenario, the information and control console may include a link for convention or conference services offered by the hotel.

In another example of location specific information and control console data, the user subscriber may be remotely accessing the gateway interface while located in a specific airport terminal. The gateway interface will be configured so that it is capable of providing ready access to information related to that specific airport terminal, i.e. information pertaining to the current flights scheduled to depart and arrive that terminal, the retail services offered in that specific terminal, etc. In this manner, the information and control console may include a link for terminal specific flight information and/or terminal specific retail services available to the user/subscriber.

Customization of the information comprising the information and control console is not limited to the gateway administrator or the network operator. The user/subscriber may also be able to customize the information that is provided in the information and control console. The user/subscriber customization may be accomplished either directly by the user configuring the information and control console manually or indirectly from the gateway interface configuring the information and control console in response to data found in the user-specific profile. In the manual embodiment the user/subscribe may be asked to choose which information or type of information they would like supplied in the pop-up for that specific network session. For instance, the user may require an alarm clock counter to insure an appointment is met or the user may require periodical updates of a specific stock quote. The information that a user customizes for the information and control console may be network session specific, may be associated with the duration of a gateway subscription or may be stored in a user/subscriber profile for an indefinite period of time. The gateway interface's ability to communicate with numerous user databases provides the basis for storing user specific profiles for extended periods of time.

Figure 7:
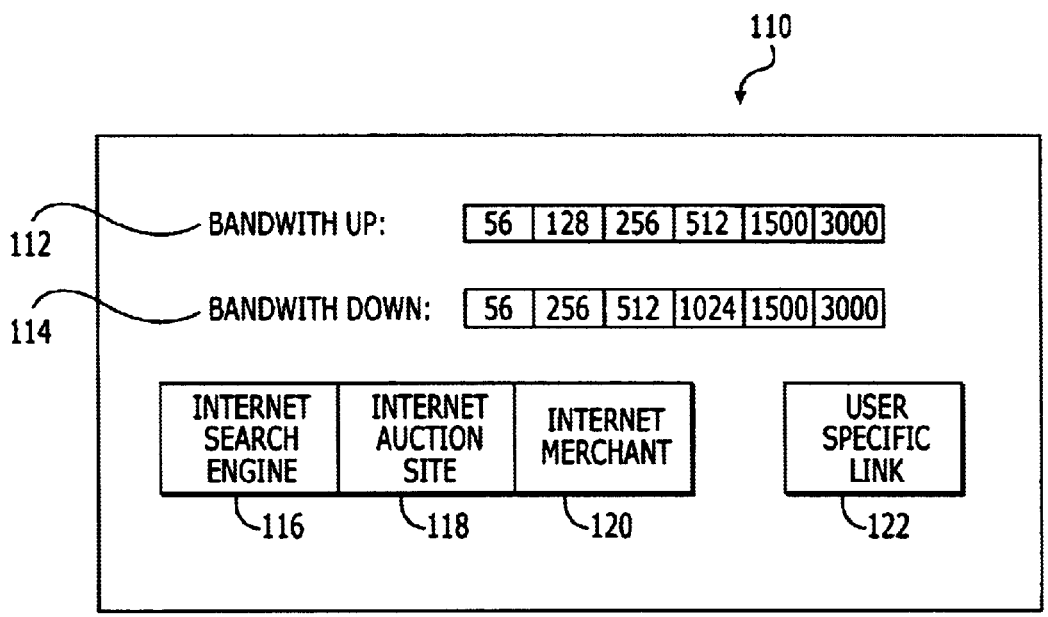

FIG. 7 illustrates an information and control console 110 that includes bandwidth up 112 selections for uploading data, bandwidth down 114 selections for downloading data, various internet links 116, 118 and 120 and a user-specific link 122. The user is able to modify bandwidths on-the-fly by selecting appropriate upload and download selections that meet the desired need of the user. For instance, if the user desires to download a data intensive file it may be desirable to increase the bandwidth and, thus, speed up the download process. Once the file has been downloaded the user may then select a more moderate bandwidth, typically at a lower billing rate. The example holds true for the upload of data. If the user desires to send a data intensive file it may be desirable to increase the bandwidth at which data is sent. The information and control console of this example also comprises a link to an Internet search engine 116, an Internet auction site 118 and an Internet merchant 120. These links provide the gateway administrator the capability to advertise to the user/subscribe other Internet sites. The user-specific link 122 provides the user/subscriber with linking capabilities to either information that the user has specifically demanded (e.g. stock quotes, news updates, etc.) or information that the user has shown an interest in (i.e. information learned by querying the user or through logging the Internet sites visited by the user).

Figure 8:
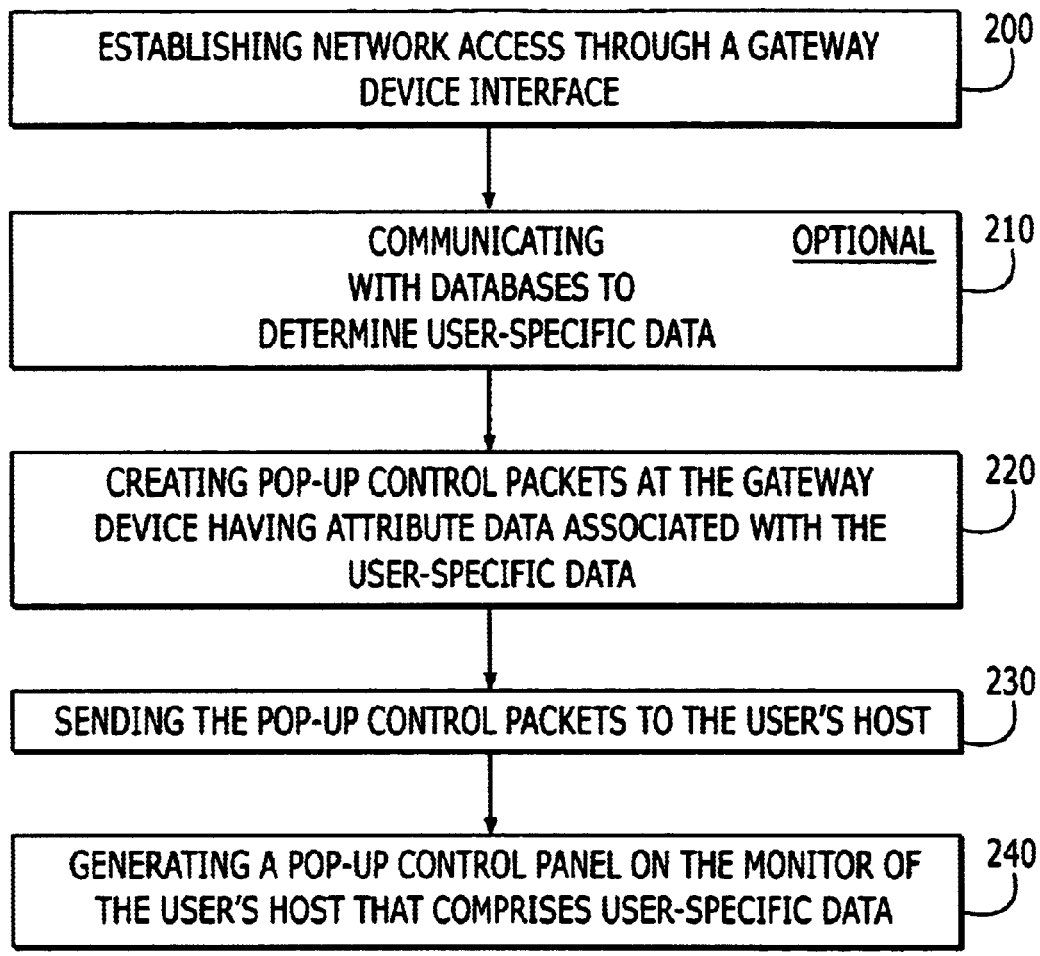
FIG. 8 is a flowchart diagram of a method for communicating to a network user data during an ongoing network session, in accordance with an embodiment of the present invention.

FIG. 8 shows a flow diagram of a method for providing a network user with an information and control console that incorporates data in accordance with an embodiment of the present invention. At step 200, the user establishes network access through a gateway interface that is in communication with the user's host and desired network. The gateway interface is capable of providing seamless network access without the need to reconfigure the host prior to network access. Communication between the user's host and the gateway interface can be accomplished though a conventional telephone/modem connection, a digital subscriber line (DSL), cable hook-up, wireless communication or any other suitable communication technique. Establishing access to the desired network will typically involve an authorization and authentication process and in some instances choosing a desired billing scheme and service level as offered by the gateway administrator or network operator. Once the user has established the network service connection and a tunnel has been opened to facilitate an open communication line between the user's host and the network, the gateway interface, at optional step 210, communicates with various databases to assemble user-specific data. These databases may be internal databases located within the gateway interface or external databases located within the infrastructure of the composite network. The user-specific data that the gateway interface assembles may comprise billing scheme related data, service level data, user profile data, remote-site related data or any other data that is related to the user or the location from which the user is located during the networking session.

At step 220, the gateway interface creates pop-up control packets that have attribute data related to the information that will be conveyed in the information and control console. These packets are typically written to accommodate standard Internet Protocol (IP). At step 230, the packets are sent to the user's host and at step 240 an information and control console is generated on the monitor of the user's host that includes predefined information. In many instances, the information that is provided for in the pop-up control window will be user-specific information conveyed from a network user profile or directly input by the user/subscriber. As previously discussed the information provided in the information and control console may be links to advertising information, links to marketing information, network monitoring information or any other predefined information.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended That which is claimed:

1. A method for communicating to a host computer information during an existing networking session, the method comprising:

establishing, via a gateway interface, a network session between a host computer and a computer network;

creating, during the established network session, information and control console packets;

sending the information and control console packets to the host computer repeatedly throughout the network session; and generating, during the established network session, one or more information and control console on a monitor of the host computer, wherein the method provides a user an ability to re-configure the network session during the established network session by input to the information and control console.

2. The method of claim 1, further comprising communicating, during the established network session, with databases in communication with the gateway interface to determine user-specific data that is used in creating information and control console packets.

3. The method of claim 2, wherein the user-specific data comprises data related to a physical location of the host.

4. The method of claim 2, wherein the user-specific data comprises data related to a profile of the user.

5. The method of claim 4, further comprising querying the user and constructing the profile of the user based upon responses from the user to the query.

6. The method of claim 4, further comprising logging networks, services and sites accessed by the user and constructing the profile of the user based upon the logged data.

7. The method of claim 2, wherein creating, during the established network session, information and control console packets further comprises creating information and control packets at the gateway interface that reflect the user-specific data.

8. The method of claim 2, wherein generating, in response to receipt of the information and control console packets, one or more information and control consoles on a monitor of the host computer further comprises generating, in response to receipt of the information and control console packets, one or more information and control consoles on a monitor of the host computer that comprises user-specific information.

9. The method of claim 8, wherein the user-specific information includes a link to another available network.

10. The method of claim 8, wherein the user-specific information includes a link to user-tailored marketing information.

11. The method of claim 8, wherein the user-specific information includes a link to user-tailored advertising information.

12. The method of claim 8, wherein the user-specific information includes a link to a gateway administrator survey.

13. The method of claim 1, wherein generating, in response to receipt of the information and control console packets, one or more information and control consoles on a monitor of the host computer further comprises generating an information and control console on the monitor of the host computer that comprises generating, in response to receipt of the information and control console packets, one or more information and control consoles on a monitor of the host that comprises a link to another available network.

14. The method of claim 1, wherein generating, in response to receipt of the information and control console packets, one or more information and control consoles on a monitor of the host computer further comprises generating, in response to receipt of the information and control console packets, one or more information and control consoles on a monitor of the host computer that comprises a link to marketing information.

15. The method of claim 1, wherein generating, in response to receipt of the information and control console packets, one or more information and control consoles on a monitor of the host computer further comprises generating, in response to receipt of the information and control console packets, one or more information and control consoles on a monitor of the host computer that comprises a link to advertising information.

16. The method of claim 1, wherein generating, in response to receipt of the information and control console packets, one or more information and control consoles on a monitor of the host computer further comprises generating, in response to receipt of the information and control console packets, one or more information and control consoles on a monitor of the host computer that comprises a link to a gateway administrator survey.

17. The method of claim 1, wherein generating, in response to receipt of the information and control console packets, one or more information and control consoles on a monitor of the host computer further comprises generating, in response to receipt of the information and control console packets, one or more information and control consoles on a monitor of the host computer that comprises network monitoring information.

18. The method of claim 17, wherein the network monitoring information includes at least one type of network monitoring information selected from the group consisting of user billing structure, user level of service, current network connection speed, quantity of data transferred, current charges accrued, elapsed time of network session, current time of day billing zone, current day of week billing zone, or current network status.

19. The method of claim 1, further comprising sending information and control console monitor heartbeats from the host computer to the gateway interface following the generation of the information and control console, wherein the sending of information and control console monitor heartbeats occurs at predetermined intervals to notify the gateway interface that the information and control console monitor remains active.

20. The method of claim 19, further comprising re-sending information and control console packets to the host computer in response to the gateway interface failing to receive information and control console monitor heartbeats after a predetermined period of time.

21. A method for dynamically changing user billing structure during an ongoing network session, the method comprising:

establishing, via a gateway interface, a network session between a host computer and a computer network;

creating, during the established network session, network monitoring information and control console packets that include information relating to the user-billing structure;

sending the network monitoring information and control console packets to the host repeatedly throughout the network session; and generating, during the established network session, one or more network monitoring information and control consoles on a monitor of the host computer that provide a user an ability to change network session billing sure during the established network session.

22. The method of claim 21, further comprising accepting, at the gateway interface, user responses to network monitoring information provided in the network monitoring information and control console to change the user-billing structure.

23. The method of claim 21, wherein creating, during the established network session, network monitoring information and control console packets at the gateway interface network that include information relating to the user-billing structure further comprises creating, during the established network session, network monitoring information and control console packets at the gateway interface network information that includes information relating to at least one type of user-billing structure information selected from the group consisting of connection speed, quantity of data transmitted, time of day billing zones, time of week billing zones, or duration of network session.

24. The method of claim 21, further comprising sending information and control console monitor heartbeats from the host computer to the gateway interface following the generation of the information and control console, wherein the sending of information and control console monitor heartbeats occurs at predetermined intervals to notify the gateway interface that the information and control console monitor remains active.

25. The method of claim 21, further comprising re-sending information and control console packets to the host computer in response to the gateway interface failing to receive information and control console monitor heartbeats after a predetermined period of time.

26. A method for dynamically changing user level of service during an ongoing network session, the method comprising:
    establishing, via a gateway interface, a network session between a host computer and a computer network;
    creating, during the established network session, network monitoring information and control console packets that include information relating to the user level of service;
    sending the network monitoring information and control console packets to the host periodically throughout the network session; and
    generating, during the established network session, one or more network monitoring information and control consoles on a monitor of the host computer that provide a user an ability to change network session level of service during the established network session.

27. The method of claim 26, further comprising accepting, at the gateway interface, user responses to network monitoring information provided in the network monitoring information and control console to change the user level of service.

28. The method of claim 26, wherein creating, during the established network session, network monitoring information and control console packets at the gateway interface that include information relating to the user level of service further comprises creating, during the established network session, network monitoring information and control console packets at the gateway interface that includes information related to connection speeds.

29. A program storage device readable by a machine, tangibly embodying a program of instructions executable by the machine to perform steps for communication to a network user information during an ongoing networking session, the program of instructions comprising the steps of:
    establishing, via a gateway interface, a network session between a host computer and a computer network;
    creating, during the established network session, information and control console packets;
    sending the information and control console packets to the host periodically throughout the network session; and
    generating, during the established network session, one or more information and control consoles on a monitor of the host,
    wherein the instructions provide a user an ability to re-configure the network session during the established network session by input to the information and control console.

30. The program storage device of claim 29, further comprising communicating, during the established network session, with databases in communication with the gateway interface to determine user-specific data that is used in creating information and control console packets.

31. The program storage device of claim 29, wherein creating, during the established network session, information and control console packets further comprises creating information and control packets at the gateway interface that reflect the user-specific data.

32. The program storage device of claim 29, wherein generating, in response to receipt of the information and control console packets, one or more information and control consoles on a monitor of the host computer further comprises generating, in response to receipt of the information and control console packets, one or more information and control consoles on a monitor of the host computer that comprises user-specific information.

33. A computer program product, comprising:
    a computer usable medium having a computer readable program code embodied therein for causing information to be provided to a network host during an ongoing networking session, the computer readable program code comprising:
    computer-readable program means for causing a host computer to establish, via a gateway interface, a network session between a host computer and a computer network;
    computer-readable program means for causing a host computer to create, during the established network session, information and control console packets;
    computer-readable program means for causing a host computer to send the information and control console packets to the host repeatedly throughout the network session; and
    computer-readable program means for causing a host computer to generate, during the established network session, one or more information and control consoles on a monitor of the host,
    wherein the computer-readable program provides a user an ability to re-configure the network session during the established network session by input to the information and control console.

34. The computer program product of claim 33, further comprising computer-readable program means for causing a host computer to communicate, during the established network session, with databases in communication with the gateway interface to determine user-specific data that is used in creating information and control console packets.

35. The computer program product of claim 33, wherein the computer-readable program means for causing a host computer to create, during the established network session, information and control console packets at the gateway interface further comprises the computer-readable program means for causing a host computer to create information and control packets at the gateway interface that reflect the user-specific data.

36. The computer program product of claim 33, wherein the computer-readable program means for causing a host computer to generate, in response to receipt of the information and control console packets, one or more information and control consoles on a monitor of the host computer-readable program means for causing a host computer to generate, in response to receipt of the information and control console packets, one or more information and control consoles on a monitor of the host user-specific information.

* * * * *